Nov. 23, 1965  D. G. ROBERTS ET AL  3,219,075
TREE FELLING CONTROL DEVICE
Filed Aug. 12, 1963

INVENTORS,
DERL G. ROBERTS
HARRY R. JUNKEN
BY
T. R. Geisler
ATTORNEY

3,219,075
TREE FELLING CONTROL DEVICE
Derl G. Roberts, 606 S St., and Harry R. Junken, 1142 Columbia St., both of Vernonia, Oreg.
Filed Aug. 12, 1963, Ser. No. 301,555
3 Claims. (Cl. 144—34)

This invention relates to the cutting of trees and timber, and, more specifically, relates to the felling of trees in cases where the trunks of the trees are apt to become broken or badly damaged when the trees crash to the ground.

It is particularly important in the felling of tall trees, which are intended for use as poles, and from which it is desired to have the maximum length of pole obtained, and in the felling of large trees from which it is desired to secure the maximum yield of marketable lumber, to prevent the breaking or damaging of the tree trunk in the felling of the tree.

It frequently happens that when a tall or large tree is cut off near the ground and allowed to fall freely the trunk will become broken as the result of the crashing of the tree to the ground. In order to prevent this, such means as block and tackle connected to other trees or to mobile towers or spars are sometimes employed for controlling the speed and force with which the tree can fall to the ground. However, as is well known, the employment of such means for controlling the falling of the tree requires extra time, labor and equipment, thus adding considerably to the cost of cutting timber.

The object of the present invention is to provide a novel tree felling control device by means of which the speed at which the tree will fall to the ground upon being cut will be reduced and controlled so as to prevent breaking of the tree trunk.

A related object of the invention is to provide a practical tree felling control device which will be simple in construction and operation and the employment of which will not entail any considerable amount of time or labor.

An additional object is to provide such a device which can be set up in place and subsequently demounted very easily for successive repeated use and which will prevent no particular maintenance problem.

A still further object of the invention is to provide a tree felling control device which can be produced at moderate cost and can easily be carried about by loggers on the job, thus meeting a current need for a device of this type in the logging industry.

The manner in which these objects and incidental advantages are attained by the device of the present invention, and the construction and manner of operation of the device will be briefly explained and described with reference to the accompanying drawings, wherein.

Figure 1:
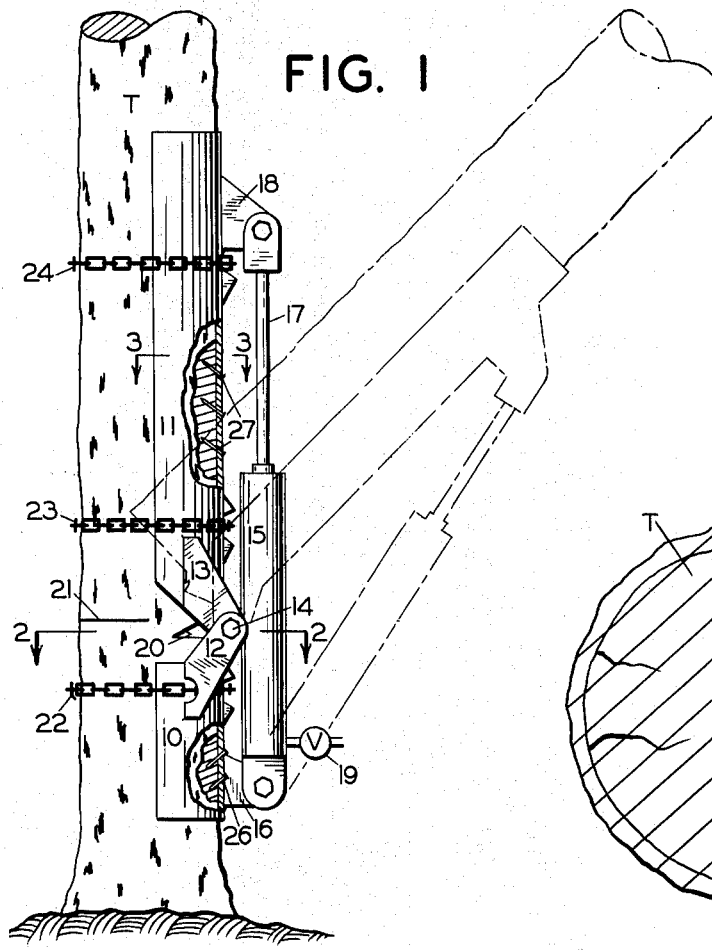
FIG. 1 is a side elevation showing the device in place on a tree prior to the felling of the tree and indicating in broken lines the position assumed by the device and tree as the tree falls.
Figure 3:
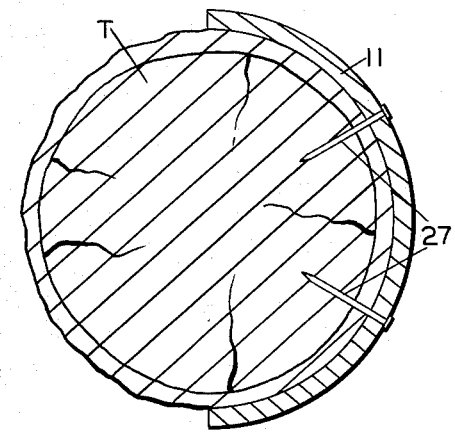
FIG. 3 is a fragmentary section on line 3—3 of FIG. 1 drawn to the same scale as FIG. 2.

In the figures the trunk of the tree which is being felled and on which the device is shown as being used is indicated by the reference character T. Referring first to FIG. 1, the device includes a lower portion 10, in the form of a heavy, curved and preferably substantially semi-cylindrical metal shell, adapted to fit against and to be held against the bottom portion of the tree trunk below the place where the cut is made in the tree for felling the tree and to continue to be held tightly in place on the tree stump until manually removed. The device also includes a companion upper portion 11, of substantially the same cross sectional size and shape as the lower portion 10, but preferably much longer than the lower portion. The two portions 10 and 11 are hingedly secured together in spaced relationship. The lower portion 10 has a pair of integral upwardly and outwardly extending parallel hinge arms 12, and the upper portion has a pair of corresponding integral downwardly and outwardly extending parallel hinge arms 13, and the two pairs of hinge arms are connected by a hinge shaft 14.

A hydraulic cylinder 15 has its bottom end extension pivotally mounted on a bracket 16 extending outwardly from the bottom portion 10 of the device. A piston in this hydraulic cylinder 15 has a piston rod 17 which extends up through the top of the cylinder and through the customary bearing seal, and the outer top end of this piston rod is pivotally connected to a bracket 18 extending from the top portion 11 of the device, in alignment with the lower bracket 15, and positioned near the upper end of the top portion 11.

The cylinder 15 is provided with a suitable, simple, and manually operable inlet and outlet control valve 19 located near the bottom of the cylinder and thus beneath the piston in the cylinder, and this valve, when open, enables hydraulic fluid to be delivered under pressure into the bottom of the cylinder so as to raise the piston and piston rod upwardly into the normal position as shown in FIG. 1. Then subsequently the opening of the valve enables the hydraulic fluid to be discharged from the cylinder to permit the piston and piston rod to be moved downwardly.

Figure 2:
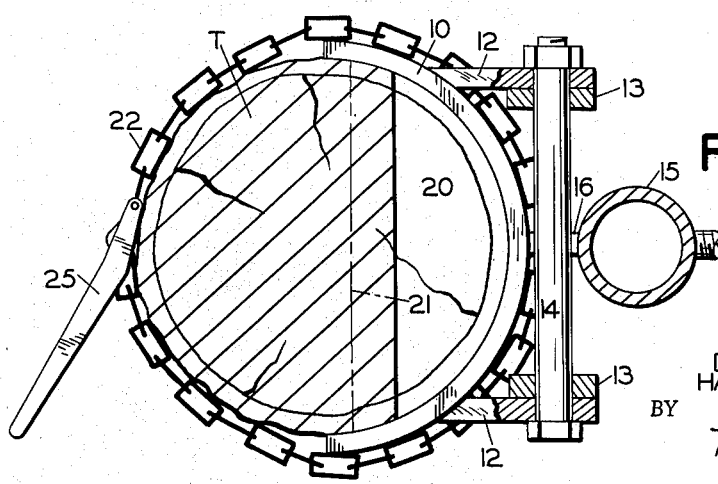
FIG. 2 is a section on line 2—2 of FIG. 1 drawn to a larger scale.

When a tree is to be felled the customary notch 20 is cut into the tree trunk on the side towards which it is desired to have the tree fall. The control device, with the hydraulic fluid in the cylinder 15 and with the valve 19 closed, and thus with the lower and upper portions of the device in substantial alignment, is mounted on the tree trunk on the same side as the notch 20 and in the position and location as illustrated in FIG. 1, the lower portion 10 of the device being spaced below the notch 20 and the upper portion 11 of the device being spaced above the notch 20. The lower and upper portions of the device are then firmly clamped to the tree trunk, at their respective locations, at which locations they will also be respectively below and above the place where the saw cut 21 is to be made for cutting the tree down. The clamping of the device to the tree trunk is accomplished by means of a clamping chain 22 for the lower portion 10 of the device and clamping chains 23 and 24 for the upper portion 11 of the device, which clamping chains engage suitable pockets or grooves provided on the device. These clamping chains are each provided with suitable tightening and clamping means, one of these being indicated at 25 in FIG. 2.

Also preferably the two portions 10 and 11 of the device are secured in their respective positions on the tree trunk by spikes driven into the tree trunk through suitable apertures provided in the portions 10 and 11, which spikes provide additional means for firmly securing both portions of the device to the tree trunk. Thus spikes 26 are driven through apertures of the lower portion 10 into the tree trunk in a downwardly inwardly sloping direction, and spikes 27 are driven through corresponding apertures in the upper portion 11 in the tree trunk preferably in upwardly, inwardly sloping direction.

When the cut 21 has been made and the tree is ready to fall, the valve 19 of the cylinder is opened sufficiently to allow the hydraulic fluid to be forced out at a restricted rate as the tree falls. As a result the speed of the fall of the tree is checked to such extent as to prevent the crashing of the tree to the ground with the speed and force with which the tree would fall if its fall were not controlled. Obviously the extent to which the valve 19 is opened will determine the speed at which a severed tree trunk is allowed to fall.

When the tree has been felled the removal of the device, thus the freeing of the portion 10 from the ground stump and the freeing of the portion 11 from the severed tree trunk, after a log or other support has been placed under the severed end of the tree trunk, is done quite easily by unfastening the clamping chains and pulling out the spikes 26 and 27. When the device has been freed in this manner hydraulic fluid is again delivered into the cylinder 15 and the valve 19 is closed, whereupon the device is ready for use on another tree.

Since it is not necessary to provide hydraulic fluid under a particularly high pressure for filling the cylinder 15 for placing the device in starting condition, it is possible to use water as the hydraulic fluid for the cylinder 15 and to use water under the ordinary pressure at which water is usually available in hose lines in logging operations. Dut to the simplicity of the device it will be obvious that no particular maintenance problem is involved in its use.

We claim:

1. A device for controlling the speed at which a tree will strike the ground in the felling of the tree, said device comprising a curved lower plate for engaging the tree trunk near its base, trunk-engaging elements carried by said plate, clamping means for securing said plate rigidly in position on the trunk, a curved upper plate spaced above said lower plate for engaging the tree trunk at a spaced distance above the base portion engaged by said lower plate, trunk-engaging elements carried by said upper plate, clamping means for securing said upper plate rigidly in position on the trunk, said lower and said upper plates being in substantial alignment when said device is in normal starting position, said upper plate being of greater longitudinal length than said lower plate, a hinge assembly connecting said lower and upper plates, said hinge assembly located on the same side of the tree trunk as said lower and upper plates and the corresponding portions of said hinge assembly rigidly secured to said lower and upper plates respectively, a hydraulic cylinder, supporting bracket means for said cylinder extending outwardly from one of said plates, one end of said cylinder pivotally mounted in said supporting bracket means, inlet and outlet control valve means in said end of said cylinder, a piston and piston rod carried by said cylinder, said piston rod extending from the other end of said cylinder, holding bracket means for said piston rod extending outwardly from the other of said plates, the outer end of said piston rod pivotally secured to said last mentioned bracket means, said support means for said end of said cylinder and said holding bracket means for said piston rod located near the opposite ends of said plates from said connecting hinge assembly, said cylinder and piston rod being positioned outwardly with respect to said hinge assembly, whereby, when said lower and upper plates are secured to the tree trunk on the side on which it is desired to have the tree fall, and the severing cut is made across the trunk between said lower and upper plates, the speed at which the severed trunk will fall to the ground will be governed by the rate at which the hydraulic fluid is released from said cylinder.

2. A device for controlling the speed at which a tree will strike the ground in the felling of the tree, said device comprising a curved lower plate for engaging the tree trunk near its base, clamping chains for securing said plate rigidly in position on the trunk, a curved upper plate spaced above said lower plate for engaging the tree trunk at a spaced distance above the base portion engaged by said lower plate, clamping chains for securing said upper plate rigidly in position on the trunk, said lower and said upper plates being in substantial alignment when said device is in normal starting position, a hinge assembly connecting said lower and upper plates, said hinge assembly located on the same side of the trunk as said lower and upper plates, said hinge assembly comprising a pair of hinge arms rigidly secured to said lower plate and extending upwardly and outwardly from said lower plate, a corresponding pair of hinge arms rigidly secured to said upper plate and extending downwardly and outwardly from the bottom of said upper plate, and a hinge shaft connecting said pairs of arms, a hydraulic cylinder, a support bracket for said cylinder extending outwardly from one of said plates, one end of said cylinder pivotally mounted in said support bracket, manually operable inlet and outlet valve means in said end of said cylinder, a piston and piston rod carried by said cylinder, said piston rod extending from the other end of said cylinder, a holding bracket for said piston rod extending outwardly from the other of said plates, the outer end of said piston rod pivotally secured to said last mentioned bracket, said support bracket for said end of said cylinder and said holding bracket for said outer end of said piston rod located near the opposite ends of said plates from said hinge arms, said cylinder and piston rod being positioned outwardly with respect to said hinge assembly, whereby, when said lower and upper plates are secured to the tree trunk on the side on which it is desired to have the tree fall, and the severing cut is made across the trunk between said lower and upper plates, the speed at which the severed trunk will fall to the ground will be governed by the rate at which the hydraulic fluid is released from said cylinder.

3. A device for controlling the speed at which a tree will strike the ground in the felling of the tree, said device consisting of a curved lower plate for engaging the tree trunk near its base, trunk-engaging elements carried by said plate, clamping chains for securing said plate rigidly in position on the trunk, a curved upper plate spaced above said lower plate for engaging the tree trunk a spaced distance above the base portion engaged by said lower plate, trunk engaging elements carried by said upper plate, clamping chains for securing said upper plate rigidly in position on the trunk, said lower and said upper plates being in substantial alignment when said device is in normal starting position, said upper plate being of greater longitudinal length than said lower plate, a hinge assembly connecting said lower and upper plates, said hinge assembly located on the same side of the tree trunk as said lower and upper plates respectively, said hing assembly comprising a pair of hinge arms rigidly secured to said lower plate and extending upwardly and outwardly from the top of said lower plate, a corresponding pair of hinge arms rigidly secured to said upper plate and extending downwardly and outwardly from the bottom of said upper plate, and a hinge shaft connecting said pairs of arms, a hydraulic cylinder, a support bracket for said cylinder extending outwardly from said lower plate, one end of said cylinder pivotally mounted in said support bracket, manually operable inlet and outlet control valve means in said end of said cylinder, a piston and piston rod carried by said cylinder, said piston rod extending from the other end of said cylinder, a holding bracket for said piston rod extending outwardly from said upper plate, the outer end of said piston rod pivotally secured to said last mentioned bracket, said support bracket for said end of said cylinder located near the bottom end of said lower plate and said holding bracket for said outer end of said piston rod located near the top end of said upper plate, said cylinder and piston rod being positioned outwardly with respect to said hinge assembly, whereby, when said lower and upper plates are secured to the tree trunk on the side on which it is desired to have the tree fall, and the severing cut is made across the trunk between said lower and upper plates, the speed at which the severed trunk will fall to the ground will be governed by the rate at which the hydraulic fluid is released from said cylinder.

References Cited by the Examiner

UNITED STATES PATENTS

| | | | |
|---|---|---|---|
| 894,731 | 7/1908 | Edey | 37—2 |
| 1,101,899 | 6/1914 | Betten | 37—2 |
| 2,882,941 | 4/1959 | Pope | 144—34 |
| 3,074,447 | 1/1963 | Bombardier | 144—34 |

ROBERT C. RIORDON, *Primary Examiner.*

WILLIAM W. DYER, JR., *Examiner.*